Jan. 13, 1970     D. B. COLYER ET AL     3,489,052
DRUMSTICK AND METHOD OF MANUFACTURE
Filed Oct. 31, 1967
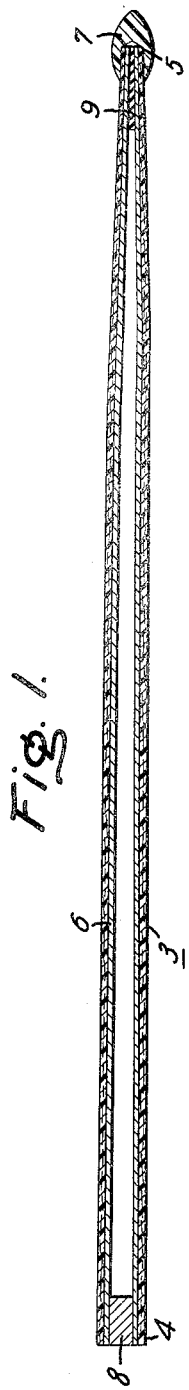
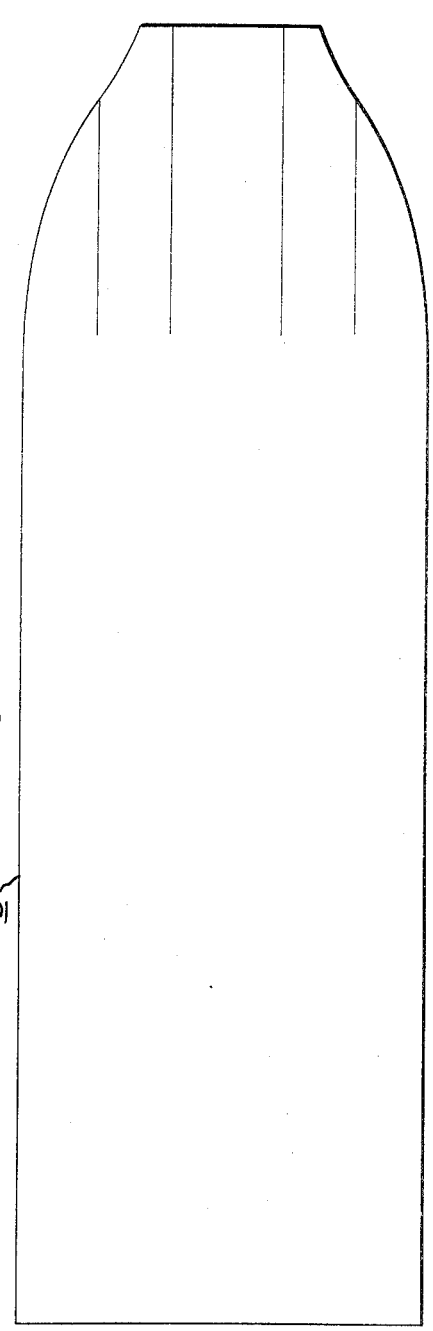
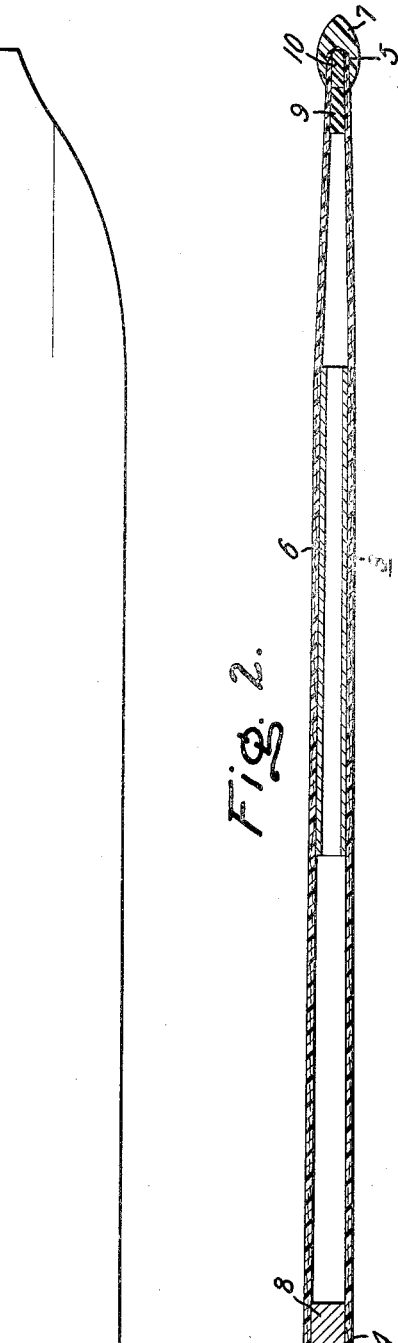
Inventors:
Duard B. Colyer,
Wanda M. Colyer,
by Louis A. Moncha

United States Patent Office 3,489,052
Patented Jan. 13, 1970

3,489,052
DRUMSTICK AND METHOD OF MANUFACTURE
Duard B. Colyer and Wanda M. Colyer, both of
1332 Wemple Lane, Schenectady, N.Y. 12309
Filed Oct. 31, 1967, Ser. No. 679,496
Int. Cl. G10d 13/00
U.S. Cl. 84—422                         14 Claims

ABSTRACT OF THE DISCLOSURE

A hollow drumstick constructed of a plastic resin and high strength reinforcing fibers oriented longitudinally of the stick. A hollow reinforcing tube may be bonded to the inside of the hollow stick to provide added structural strength. Contour of the drumstick is similar to that of wooden drumsticks and distribution of the fiber reinforced plastic resin material results in a drumstick exactly duplicating the length, weight, weight distribution and flexural characteristics of wooden drumsticks. The method of manufacture comprises cutting the fiber reinforced resin material in a desired pattern, wrapping the material on the reinforcing tube or a tapered mandrel and then wrapping the material with a thin film heat shrinkable material. After heat curing, the solidified resin-thin film material is finished to a desired degree of roundness. Plugs may be provided in the hollow stick tip and handle ends, and a plastic tip closely fitted over the tip end and bonded thereto.

---

Our invention relates to an improved drumstick having the desirable characteristics of wooden drumsticks but without their inherent disadvantages and to a method of manufacture thereof, and in particular, to a hollow drumstick constructed of a fiber reinforced plastic resin.

Solid wooden drumsticks are the most conventional type employed by percussionists. In particular, drumsticks fabricated from high strength woods such as hickory have gained recognition through years of use as being optimum as to the sound produced on the drum, with the proper weight, weight distribution and flexural characteristics. The weight distribution, flexural characteristics and absolute weight of the drumstick are the three most important characteristics in determining the "feel" of a drumstick to the drummer, a satisfactory "feel" of the drumstick being necessary to execute the intricate mechanics of playing drums. It is generally accepted in the percussion field that a high quality solid wooden drumstick fabricated from hickory has a weight distribution or center of gravity of approximately 56% of the stick length from the tip end, a flexural characteristic or tip end deflection rate of approximately 0.020 inch per pound of force (with the stick supported at its center of gravity), and the absolute weight is directly proportional to the stick handle diameter and stick length which are approximately 0.53 and 16.0 inches, respectively. Although the absolute weight and weight distribution of the stick determine the holding position of the stick by the drummer, the flexing characteristics of the stick, as a result of the tip striking an instrument, is by far the most important "feel" characteristic and should be such as to permit rapid and responsive playing. The flexural characteristics may be compared to a cantilever beam with the hand position being the support and principal pivot point, and a single concentrated load at the tip.

Unfortunately, wooden drumsticks inherently change shape due to change in moisture content, and this results in a change of stick longitudinal straightness commonly termed warping. Change in wood moisture content also changes the weight and weight distribution, thereby requiring a modification in the holding position and flexural characteristics. Thus, the wooden stick, though initially having many desired characteristics, soon undergoes a serious deterioration in these desired characteristics.

Attempts have been made to maintain the desired properties of wooden drumsticks by chemical treatment of the wood, but no successful means has been found for completely correcting the deficiencies without significant alteration of the weight and flexural characteristics. Attempts have also been made to utilize metals, plastics, and reinforced plastics to overcome the problems of weight change and flexure characteristics, but in each case both objectives have never been met. Thus, in a molded glass reinforced plastic solid drumstick, the stick weight is fifty percent more than the wooden version, and the flexural strength is substantially below requirements, the latter effect resulting in a rubbery "feel" when used on a percussion instrument. In the case of a stick using a hollow aluminum tube for the handle and a molded plastic for the tip, the handle is too stiff and the tip end too flexible, the center of gravity being too close to the tip end thereby obtaining an undesired weight distribution. Thus, there is a great need for a drumstick having the desirable characteristics initially possessed by the solid wooden drumstick.

Therefore, one of the principal objects of our invention is to provide a new and improved drumstick which has and retains all of the desirable characteristics initially possessed by solid wooden drumsticks.

Another object of our invention is to provide a new method of manufacturing our new drumsticks.

Briefly stated, our invention is a hollow drumstick constructed of a plastic resin reinforced with high strength fibers oriented longitudinally of the stick. A hollow reinforcing tube fabricated of a high strength material such as aluminum may be provided within the hollow stick along the full or part length thereof, and bonded thereto for strengthening the hollow stick against transverse impact blows. A plug is provided within the handle end of the hollow stick for added structural strength of the adjacent hollow stick portion. A high strength plastic tip is provided over the stick tip end. The stick is manufactured by cutting a cloth form of the fiber reinforced resin material in a prescribed flat pattern. The cloth is wrapped on the full length reinforcing tube, or on a tapered mandrel of suitable contour, in the case of the part length reinforcing tube, and a heat shrinkable thin film material is then wrapped thereover. After heat curing, the solidified fiber reinforced resin and thin film material is finished to a desired degree of roundness and the plug and tip are bonded thereto.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawing, wherein like parts in each of the several figures are identified by the same reference character, and wherein:

FIGURE 1 is a cross-section view of a drumstick constructed in accordance with our invention;

FIGURE 2 is a cross-section view of a modified version of the drumstick illustrated in FIGURE 1; and FIGURE 3 is a typical pattern for cutting the fiber reinforced resin material.

Referring now in particular to FIGURE 1, there is shown a preferred embodiment of our drumstick. Our stick is comprised of a hollow tube 3 of a plastic resin reinforced with individual high strength fibers oriented longitudinally of the stick. The plastic resin material may be a phenolic, polyester, epoxy, urethane or combination of these resins. The reinforcing fibers may be made of glass or other high strength fiber materials. A preferred embodiment of our drumstick is fabricated of a reinforced plastic consisting of 62 percent unwoven glass fibers and 38 percent epoxy resin. The length, outside diameter distribution along the length (the stick geometry), weight, weight distribution and flexural characteristics of the completely assembled stick are designed to so closely duplicate the highest quality wooden stick prior to change in moisture content therein, that for all practical purposes our drumstick exactly duplicates the wooden drumstick in its desirable characteristics. Typical drumstick geometry may be described as including a handle portion and a shank portion. The handle is the portion held in the drummer's hand during normal use, and generally comprises a straight cylindrical section from the butt (handle) end 4 to the region where the stick begins to taper. The shank is the portion of decreasing diameter to the tip end 5 of the stick. The rate of shank taper (change in diameter along the longitudinal axis) is gradual from the end of the handle to approximately ⅔ of the shank length, the taper rate thence increasing to near the tip end 5 where the taper approaches zero to form a constant diameter (cylinder) at the tip end. Thus, the outside and inside contours of tube 3 have zero taper along the handle (approximately the first ¾ of the tube from handle end 4) and along the shank (the final ¼ of tube 3 from tip end 5) there is a taper which gradually increases and then decreases to zero at tip end 5. The desired weight and weight distribution is partly determined by fabricating the hollow tube 3 of predetermined thicknesses along its length, as will be described subsequently in the manufacturing process which also forms a part of our invention. The desirable flexural characteristics are achieved by our choice of the fiber reinforced plastic resin as the material for fabrication of tube 3, and in particular, by the orientation of reinforcing fibers in the stick longitudinal direction. This orientation of the fiber reinforced plastic resin also significantly increases the structural strength of the hollow stick against transverse impact blows such as those induced by rim shots wherein the metal rim of a drum is struck by the portion of the stick adjacent the tip end or the handle end.

A hollow reinforcing tube 6 fabricated from a high strength material such as aluminum may be provided within hollow tube 3 and bonded thereto for further strengthening of or hollow drumstick against transverse impact blows, but is not an essential element. Reinforcing tube 6 is of the same length and contour as tube 3, as illustrated in our preferred embodiment in FIGURE 1, or may extend only along a part of the length of tube 3 as illustrated in the FIGURE 2 embodiment. The wall thickness of tube 3 is approximately .060 inch along the handle and approximately .050 inch along the shank. The wall thickness of full length reinforcing tube 6, if employed, is approximately 0.020 inch along the handle and decreases along the shank to approximately 0.015 inch at the tip end.

A high strength plastic tip 7 of a suitable material such as nylon is provided over the tip end of hollow tube 3 and bonded thereto.

The above-described elements, when properly assembled, define a hollow drumstick which is satisfactory; however, a solid plug 8 is preferable provided within the hollow handle end 4 to cover the hole and increase the structural strength of the drumstick in the region of the handle end. Plug 8 may also be employed as a means for altering the assembled drumstick weight and weight distribution, if desired, by proper choice of the plug length and material density. Plug 8 is fabricated of a material such as reinforced plastic or aluminum. As a further refinement, the sound produced by or drumstick can be altered, if desired, by providing a plug 9 of soft material inside hollow tube 3 at tip end 5. Plug 9 may be fabricated of a material such as an elastomer for deadening or damping the generally high pitched sound produced by a plastic tip, and thereby producing the same sound as a wooden drum stick tip.

A second embodiment of our hollow drum stick is illustrated in FIGURE 2. In this version, reinforcing tube 6 does not extend the full length of hollow tube 3, and is positioned in the handle occupying approximately the central ⅓ portion of tube 3. Tubes 3 and 6 are made of the same material as in the FIGURE 1 embodiment, but the FIGURE 2 version obviously does not possess the same high degree of structural strength characterized by our preferred embodiment employing full length tube 6. The wall thickness of the shorter length tube 6 is approximately 0.020 inch. A high impact solid plug 10 of a suitable material such as the plastic nylon is provided within the hollow stick tip 5 and bonded thereto. A high strength plastic tip 7 and handle end plug 8 are also provided as in the case of the FIGURE 1 embodiment. Hollow tube tip 5, plug 10 and plastic tip 7 each have cylindrical mating surfaces providing interference fits such that the assembled structure thereof, upon bonding with an adhesive of the cylindrical surfaces thereto, obtains a homogeneous solid at the tip end 5 which increases the structural strength of the adjacent hollow drum stick portion.

A preferred method for manufacturing our hollow drum stick is as follows. The (glass) fiber reinforced plastic resin material used in fabricating tube 3 is commercially available in unwoven, uncured mat form with a scrim reinforcing cloth backing. The orientation of the reinforcing glass fibers in the mat is unidirectional. The unwoven, fiber reinforced mat and cloth backing are cut in a selected pattern such as illustrated in FIGURE 3 to provide the necessary wall thickness and contour of the hollow tube 3. The pattern is cut such that the glass fibers are oriented principally in the longitudinal direction of the pattern. Although the pattern is illustrated as being cut to the exact length of the drum stick, the cloth backed mat may be cut at longer lengths and the subsequent heat cured structure then cut to the desired length. Several straight cuts (four being shown) are made along the stick longitudinal axis in the shank portion for aiding in the subsequent wrapping step. The fiber reinforced mat is wrapped on tube 6. The mat is of 0.014 inch thickness and a selected number of plys of this mat, determined by the tube 6 diameter and various widths of the mat pattern, are wrapped on tube 6. As a typical case, seven plies are wrapped on the handle end, and five plies on the tip end. After this wrapping step, wherein tube 6 forms an integral part of our drum stick and also functions as a mandrel, a heat-shrinkable, thin-film pressure tape material is wrapped over the plastic mat plies. Due to the subsequent heat shrinkage of the tape, it should be wrapped tightly, but not too tight to avoid breakage of the tape when heated. The pressure tape, plastic mat wrapped aluminum tube 6 is then heat cured in an oven sufficiently to obtain a solidified integral hollow structure comprising inner tube 6 and outer tube 3. This heat curing may be approximately 50 minutes at 300° F. for the glass reinforced epoxy resin compound, as one satisfactory process. Obviously the time-temperature variables may be varied inversely over a range of values, and other values utilized with other fiber reinforced plastic materials. The heat curing process shrinks the tape to provide a compression of the fiber reinforced resin thereby providing a high density void-free tube 3 and aiding in the formation of a round outer contour thereof.

After the curing process, the integral hollow structure of tubes 6 and 3 is ready for finishing. The finishing operation consists of sanding the cured stick to remove the outer tape and to roughen the finish for absorption of varnish or other material adapted to seal the outer surface from dirt. If desired, the drum stick outer surface can also be dyed or preferentially colored prior to the varnish sealing step to obtain a wood grain effect along the length of the drum stick. Finally, the sealing varnish may incorporate a fine sand or grit to provide a rough surface which aids the drummer in gripping the drum stick.

Nylon plastic tip 7 is closely fitted over hollow stick tip end 5, and plug 8 is inserted with a close fit into hollow stick handle end 4. Tip 7 and plug 8 are then bonded to the hollow drum stick by using a material such as a high impact resistant epoxy urethane adhesive used to bond the glass reinforced plastic mat on the aluminum tube. Tip 7 and plug 8 may be bonded to the drum stick either immediately before or after the above-described finishing operation, the preferred procedure being to bond such elements after the finishing operation. The elastomeric material 9, if employed, is inserted and bonded inside tip end 5 prior to the fitting of tip 7 thereon.

The FIGURE 2 embodiment of our drum stick is manufactured by a similar process as the FIGURE 1 embodiment. The use of a reinforcing tube 6 of length less than tube 3 requires, however, that the glass reinforced plastic mat be wrapped by a different arrangement. In particular, a mandrel fabricated from a metal such as high strength steel, and having a slight taper (approximately .003 inch diameter per inch length) along the handle portion, and the prescribed contour along the shank portion of the inner surface of tube 3 along the shank, is utilized. The mandrel is coated with a suitable release agent which is initially tacky, such as a silicone release agent. The glass reinforced plastic mat and pressure tape are then wrapped on the mandrel in the manner described with reference to fabricating the FIGURE 1 drum stick. After the heat curing process, the solidified hollow tube 3 is removed from the mandrel and the same finishing operation initiated as described hereinabove. Reinforcing tube 6 is inserted and bonded to the inner surface of tube 3, this step being accomplished before or after the finishing operation. Plug 10 is then inserted within the hollow stick tip end 5 (after the elastomeric material 9 is inserted, if employed, and bonded to the inner surface of tube 3 adjacent tip end 5) and tip 7 is closely fitted over tip end 5 such that the interference fits of tip end 5, plug 10 and tip 7 obtain the homogeneous solid at tip end 5 after the bonding process. Finally, plug 8 is inserted into stick handle end 4 and bonded thereto as described hereinabove.

From the foregoing description, it can be appreciated that our invention attains the objectives set forth and makes available an improved hollow drum stick having the desirable length, weight, weight distribution and flexural characteristics of high quality wooden drum sticks, and the method of manufacturing such drum stick. The desirable characteristics are achieved by our use of a fiber reinforced plastic resin alone, or with a reinforcing inner tubular member of predetermined thicknesses and contours for the hollow body portion of our drumstick.

Having described two embodiments of our new drumstick, it is believed obvious that other modifications and variations of our invention are possible in light of the above teachings. Thus, various grooves or other indentations may be provided in the handle, as desired, for the particular needs of individual drummers. The elastomer material 9 may include natural rubber, synthetic rubber or elastic plastics such as polyvinyl chloride, these examples not to be construed as limitations. The heat-shrinkable thin-film pressure tapes may be made of materials such as polyester, polyimide, polyvinyl fluoride or cellophane. The plastic resin material forming tube 3 is not limited to having reinforcing fibers only in the longitudinal direction and thus may have such fibers in both the longitudinal and other directions in either woven or nonwoven form. The wall thicknesses of tube 3 may be in the range of 0.020 to 0.080 inch along the shank and 0.030 to 0.090 inch along the handle. Tube 6 thickness may be in the range of 0.015 to 0.040 inch along the handle and 0.010 to 0.030 inch at the tip end. Finally, the various contours of our drumstick may be modified slightly, to suit particular requirements, without appreciable loss in any of the above-described desirable characteristics.

What we claim as new and desire to secure by Letters Patent of the United States is:

1. In an improved drumstick comprising a first hollow tube comprised of a plastic resin material reinforced with high strength fibers oriented at least along the longitudinal axis of the drumstick, said first hollow tube being hollow along the entire length thereof and comprising only a single member and forming the hollow body portion of the drumstick and having a handle portion of a first predetermined wall thickness in the range of 0.030 to 0.090 inch and substantially no taper, and a shank portion of a second predetermined wall thickness in the range of 0.020 to 0.080 inch and selected tapers therealong, the nontapered and selected tapers of the handle and shank portions providing a desired outside contour and the first and second predetermined wall thicknesses providing the desirable weight and weight distribution characteristics of a high quality wooden drumstick, the particular fiber reinforced plastic material consisting of approximately 62% unwoven glass fibers and approximately 38% plastic resin material.

2. In the improved drumstick set forth in claim 1, the improvement further comprising a second hollow tube coaxial with said first hollow tube and bonded to the interior surface thereof, said second tube comprising a high strength metal.

3. In the improved drumstick set forth in claim 2 wherein said second hollow tube extends along the entire length of said first tube to thereby increase the structural strength of the drumstick against transverse impact.

4. In the improved drumstick set forth in claim 3 wherein said second hollow tube has an exterior contour substantially the same as the interior contour of said first tube.

5. In the improved drumstick set forth in claim 2 wherein said second hollow tube extends along only a part of the length of said first tube.

6. In the improved drumstick set forth in claim 5 wherein said second hollow tube has the contour of a right cylinder and is bonded to the inner surface of the handle portion of said first tube.

7. The improved drumstick set forth in claim 2 wherein said high strength metal is aluminum.

8. In the improved drumstick set forth in claim 1 wherein the high strength fibers are individual unidirectional oriented unwoven glass fibers.

9. In the improved drumstick set forth in claim 1 wherein the plastic resin material is selected from the group consisting of phenolic, polyester, epoxy and urathane resins or combinations thereof.

10. In the improved drum stick set forth in claim 1 and further comprising a high strength plastic tip closely fitted over and bonded to the shank end of said first hollow tube.

11. In the improved drumstick set forth in claim 1, and further comprising a high impact plug fitted within the shank end of said first tube and bonded to the interior surface thereof, the combined structure of said plug and said plastic tip and the shank end of said first tube having complementary fits to produce a homogeneous solid at the shank end upon bonding thereof.

12. The improved drumstick set forth in claim 1 and further comprising a plug fitted within the handle end of said first tube and bonded to the inner surface thereof for covering the handle end hole and increasing the structural strength of the handle.

13. The improved drumstick set forth in claim 1 and further comprising a plug of elastomeric material fitted within the shank end of said first tube for altering the sound quality of the drum stick.

14. In the improved drumstick set forth in claim 1 wherein the center of gravity of said stick being approximately 56% of the stick length from the shank end.

References Cited

UNITED STATES PATENTS

| | | | |
|---|---|---|---|
| 3,147,660 | 9/1964 | Brilhart | 84—422 |
| 3,301,119 | 1/1967 | Gilbert | 84—422 |
| 2,726,185 | 12/1955 | Howald | 156—174 |
| 3,165,964 | 1/1965 | Stys et al. | 84—422 |

RICHARD B. WILKINSON, Primary Examiner

LAWRENCE R. FRANKLIN, Assistant Examiner